INVENTORS
Robert V. Adair
BY  Earl D. Dammert
Richard W. Treverton
ATTORNEY

Nov. 11, 1958    R. V. ADAIR ET AL    2,860,077
QUENCH HARDENING METHOD AND MACHINE
Filed Dec. 22, 1955    9 Sheets-Sheet 4

Nov. 11, 1958 R. V. ADAIR ET AL 2,860,077
QUENCH HARDENING METHOD AND MACHINE
Filed Dec. 22, 1955 9 Sheets-Sheet 5

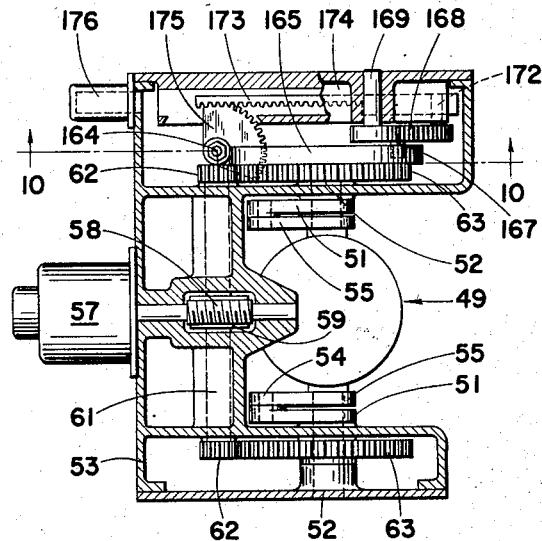
FIG. 9
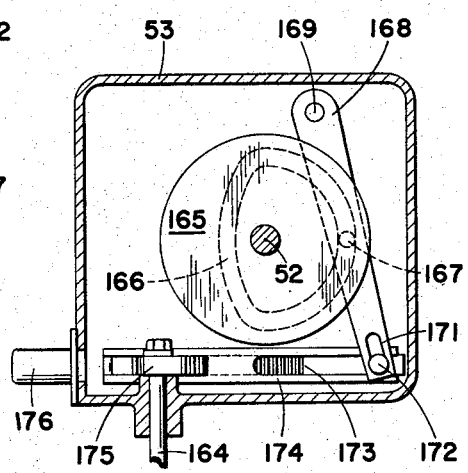
FIG. 10
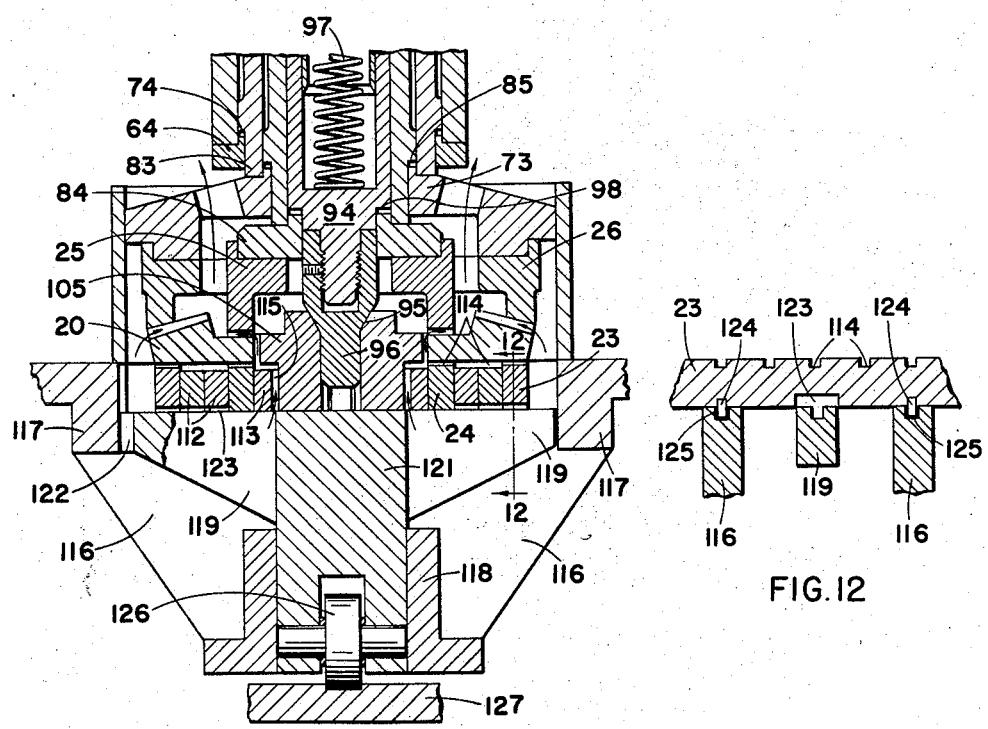
FIG. 11
FIG. 12

United States Patent Office 2,860,077
Patented Nov. 11, 1958

2,860,077

QUENCH HARDENING METHOD AND MACHINE

Robert V. Adair, Rochester, N. Y., and Earl D. Dammert, Penfield, N. J., assignors to The Gleason Works, Rochester, N. Y., a corporation of New York Application December 22, 1955, Serial No. 554,857

22 Claims. (Cl. 148—12.4)

The present invention relates to a method and machine for quench hardening ring-shaped parts made of steel or other quench hardenable material, such for example as automobile rear axle drive gears and roller bearing races.

Present practice is to heat such parts in a suitable furnace to a temperature on the order of 1450–1700 degrees F. and then load them, one at a time, into a quenching press which may be of the kind shown in Patent No. 2,494,984, granted January 17, 1950, to O. F. Bauer. In such press the part is clamped, by action of a pressure operated ram, between upper and lower dies which hold it in straightened or slightly flexed condition while a liquid quenching medium is circulated around it to quench it to a temperature of about 120 to 180 degrees F. The upper and lower dies are then opened and the part is unloaded from the press. In many cases a single operator can handle several such presses, since the time required for loading and unloading may be only a fraction of the time required for the quenching operation. The presses require considerable floor space and one factor which limits the productivity of an operator is the distance he must walk between the heating furnace or furnaces and the quenching presses.

A primary object of the present invention is an improved quenching method and machine by which a much larger number of workpieces may be treated in a given period of time, to thereby conserve both floor space and operator time. Preferably the machine will receive and discharge workpieces as rapidly as the machine operator can load them manually on a sustained basis, or, if preferred, the workpieces may be brought from the furnace to the machine automatically by a suitable mechanical transfer mechanism timed with the operating cycle of the machine. However the structure of such transfer mechanism is not a part of the present invention.

There are two principal aspects of the method. The first is that, just prior to quenching, the parts are flexed between dies with a diaphragming action, which we will refer to as toroidal flexure. Such flexure has been found to reduce substantially the amount of distortion of the parts when they are subsequently quenched by liquid while held clamped between the dies. This makes particularly feasible the second principal aspect of the new method, which is to retain each part clamped between the dies for only a small fraction of the complete quenching cycle and then to eject it from the dies although keeping it immersed in the liquid quenching medium until it has cooled to the desired degree, preferably until it has become cool enough for manual handling. As soon as the workpiece is ejected the dies may receive the next workpiece, so that a machine having a single set of dies can handle a number of times as many workpieces as a conventional quenching press.

So far as concerns the machine, the preferred embodiment of the invention is arranged to receive a workpiece between suitable dies, to effect relative motion of the die parts which will flex the workpiece toroidally; to then quench the workpiece while clamped between the die parts, the quenching operation including the immersion of the dies of the workpiece clamped between them into a tank containing liquid quenching medium; to then discharge the workpiece from the dies onto a conveyor which will carry it through the quenching tank; and, finally, to discharge the workpiece from the tank. This preferred embodiment of the machine is semi-automatic in operation, the operator (or mechanical transfer means not a part of the present invention) being required only to place a heated workpiece between the dies and then start the machine.

The lowering of the work-clamping dies into the quenching medium has the advantage of keeping the workpiece continuously subjected to quenching medium throughout the entire quenching operation, thereby avoiding any hiatus in the quenching operation which could cause the case or surface portion of the workpiece to be reheated by thermal conduction from its interior part sufficiently to destroy its hardness. There is the further advantage that the length of the machine's operating cycle is reduced by reason of the fact that quenching may take place while the dies are being immersed and also while the workpiece is being transferred from the dies to the conveyor.

The foregoing and other objects and advantages of the invention will appear from the following description made with reference to the accompanying drawings, wherein:

Fig. 9 is a detail horizontal sectional view in plane 9—9 of Fig. 4;

Fig. 10 is a vertical section in the plane 10—10 of Fig. 9;

Fig. 11 is a vertical section through the lower dies and their supporting structure;

Fig. 12 is a vertical sectional view in the plane 12—12 of Fig. 11;

Figure 6:
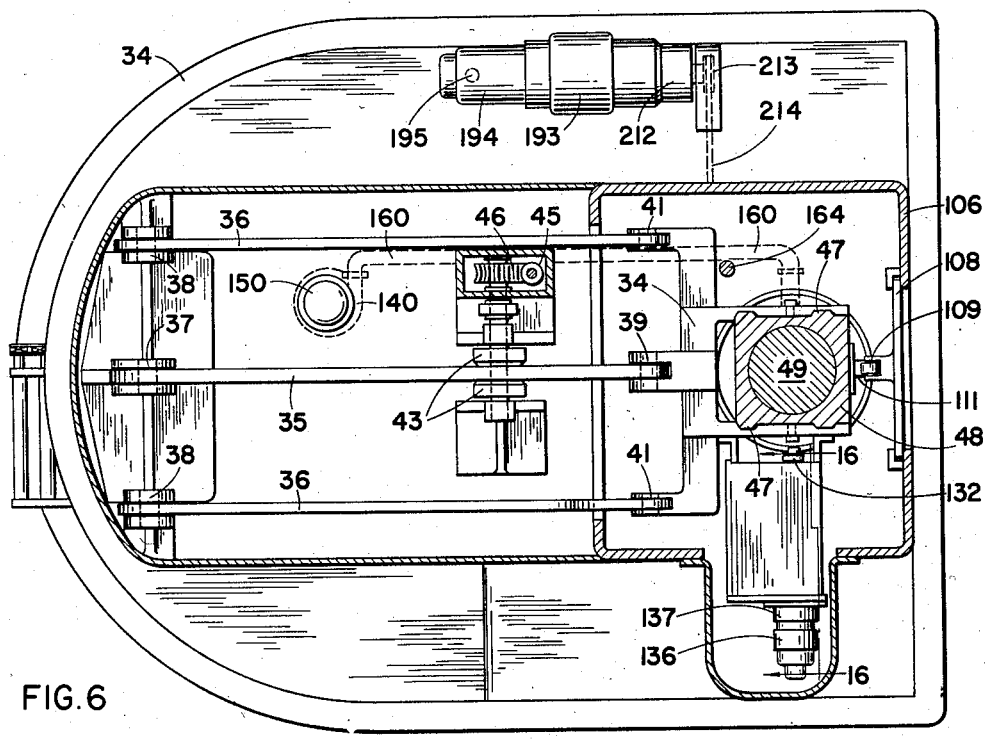
Fig. 6 is a plan sectional view in planes 6—6 of Figs. 4 and 5.
Figure 13:
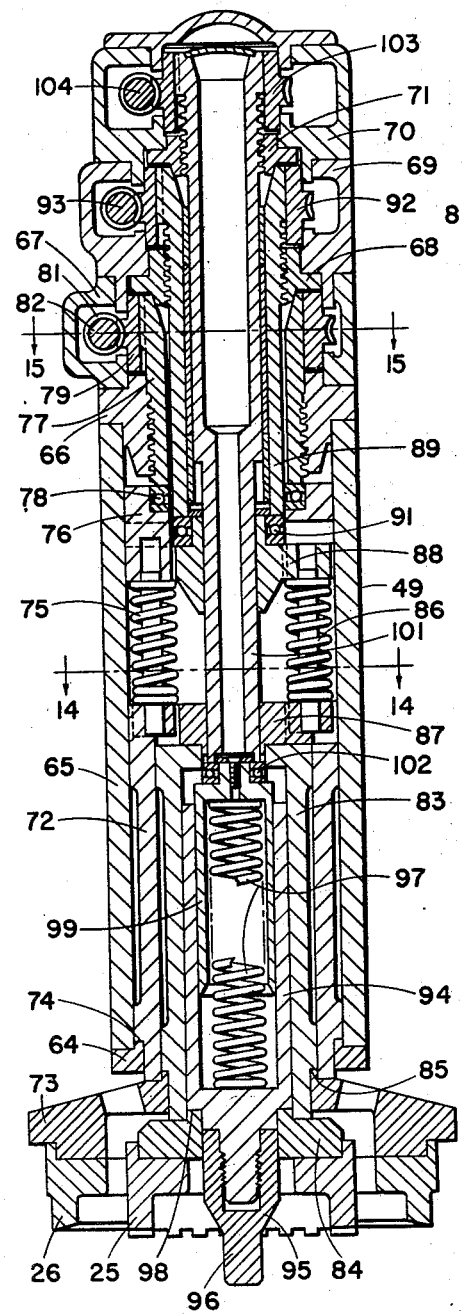
Fig. 13 is a vertical sectional view through the ram of the press in the same plane as Fig. 11.
Figure 15:
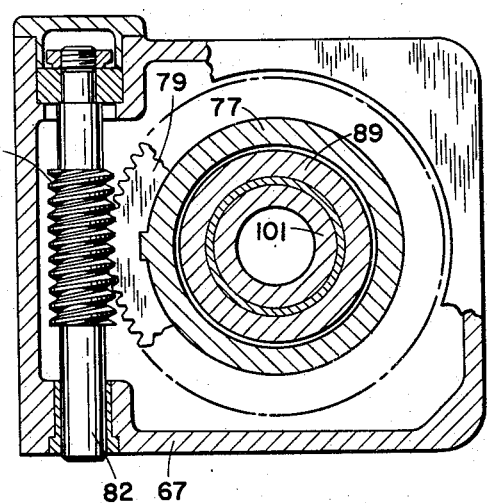
Figure 14:
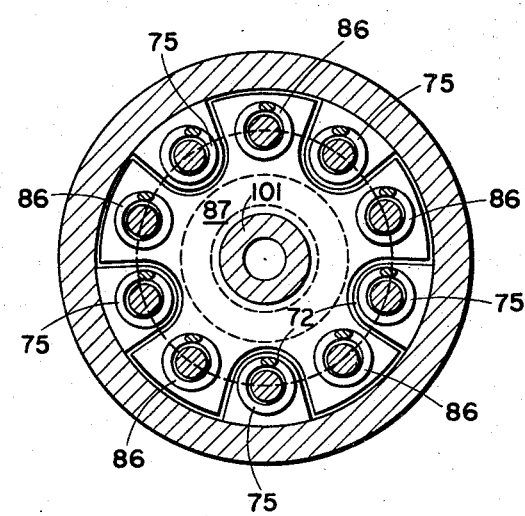
Figure 16:
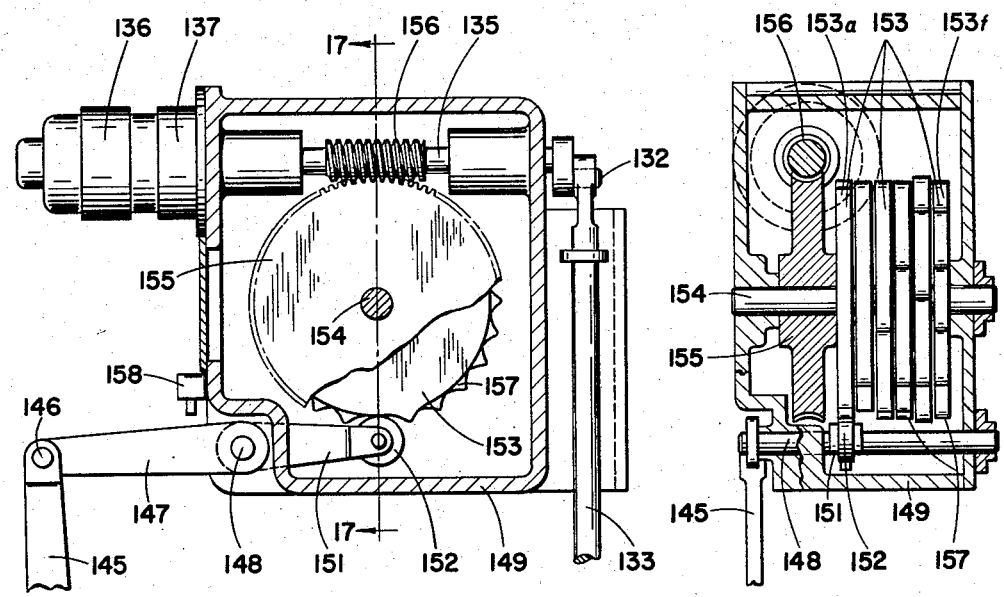
Figure 17:
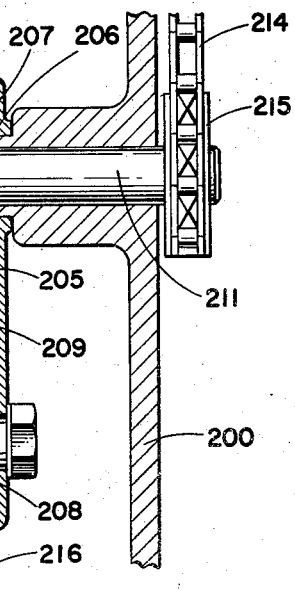
Figure 18:
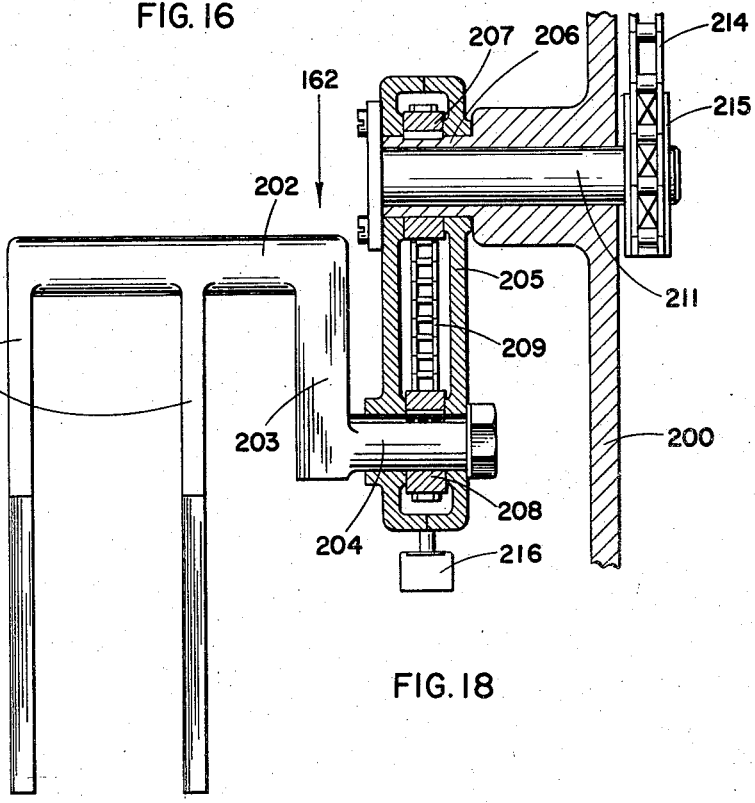
Figure 20:
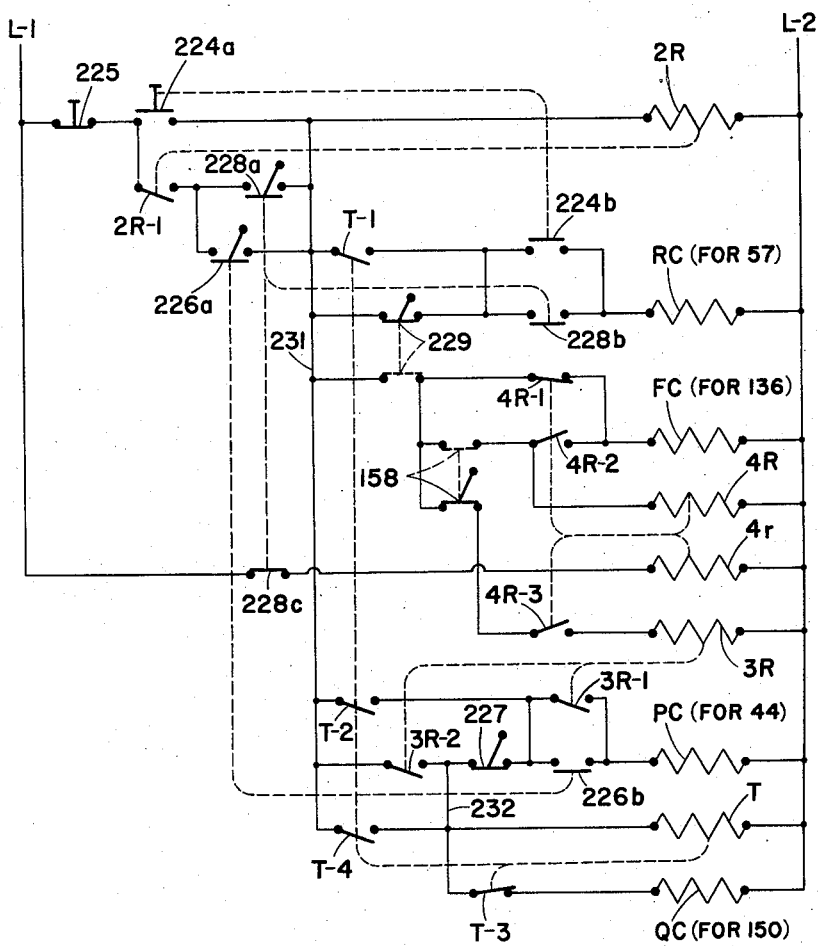
Figure 19:
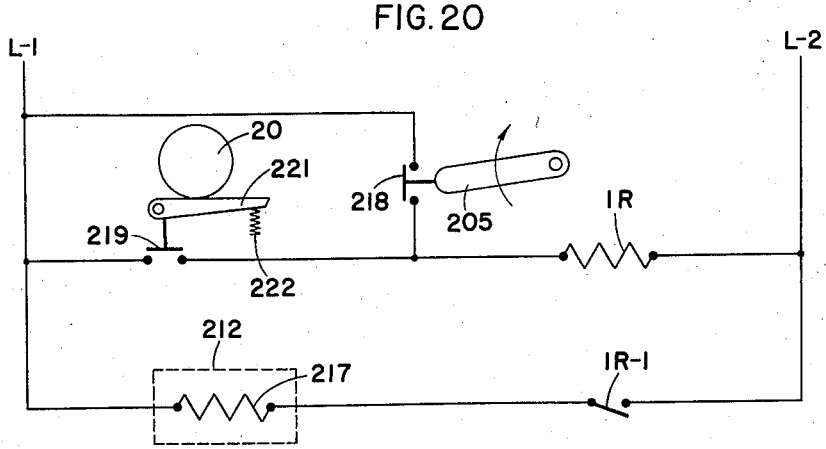

Figs. 14 and 15 are horizontal sections in planes 14—14 and 15—15 respectively of Fig. 13;

Fig. 16 is a detail vertical section in plane 16—16 of Fig. 6;

Fig. 17 is a vertical sectional view in plane 17—17 of Fig. 16;

Fig. 18 is a plan sectional view showing the details of the elevator mechanism of the conveyor system;

Fig. 19 is a diagrammatic view of the automatic control system for the elevator; and, Fig. 20 is a diagram showing one way in which the machine may be wired for semi-automatic operation.

Figure 1:
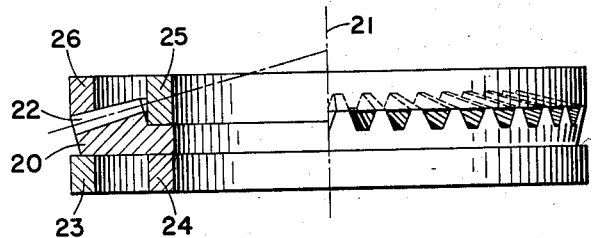
Figs. 1, 2 and 3 are diagrams illustrating the method of flexing the workpiece.
Figure 2:
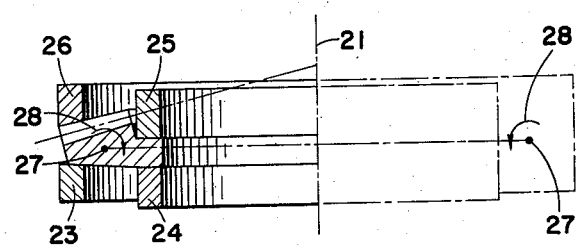
Figure 3:
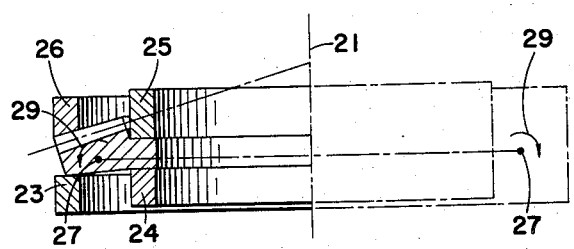

The toroidal flexure method of the present invention is illustrated diagrammatically in Figs. 1, 2 and 3, where the workpiece is a bevel ring gear 20 whose axis is 21 and whose teeth are 22. The back face of the gear is seated on lower dies 23 and 24, while the front face is engaged by upper dies 25 and 26. All of these dies are ring-shaped and are concentric with axis 21. The upper die 25 engages the front face of the inner flange of the gear while the upper die 26 engages the tops of the teeth 22 near their outer ends. To place a heated gear in the die set described, the upper dies are raised. After placement of the gear on the lower dies and subsequent lowering of the upper dies to clamp the gear, the die elements 24 and 25 are alternately lowered and raised relative to dies 23 and 26. When lowered, as shown in Fig. 2, the gear is flexed toroidally in the direction of arrows 28 about axial circle 27 which is concentric with axis 21. When elements 24 and 25 are raised relative to elements 23 and 26, as shown in Fig. 3, the gear is flexed toroidally about neutral circle 27 in the opposite direction, as indicated by arrows 29. The relative motion between dies 24, 25 and the dies 23, 26, and also the amount of the toroidal flexure is shown greatly exaggerated in Figs. 2 and 3. In practice the amount will be of the general order of magnitude necessary to flex the heated gear to its elastic limit and will rarely exceed a vertical displacement of 0.02 inch.

The exact amount of flexure and the number of flexing cycles which will result in workpieces with minimum distortion are best determined by trials with workpieces of the same size, shape and composition as those which are to be subsequently treated in the machine on a production basis. Of course in such trials the heat treating procedure will be the same as that to be used in subsequent production, such procedure embracing the temperature to which the workpieces are initially heated, the kind of liquid quenching medium and its temperature, the duration of the initial quench conducted while the dies remain closed with the workpiece clamped therebetween and the duration of the subsequent quench carried out after the workpiece has been released from the dies. These factors are not within the province of the present invention, since they will be decided upon by the metallurgist in charge of the operation on the basis of the degree of hardness and the depth of the hardened case necessary for the particular use to which the workpieces are to be put.

Whatever the real reason for the improvement in distortion of workpieces resulting from use of the present invention, our theory is that warping of a workpiece during heating may result from strains induced during the initial forging of the blank and the subsequent machining operations; that to straighten a distorted part it is necessary that its elastic limit be exceeded; and that this is accomplished by the toroidal flexure described above when of such magnitude that the elastic limit of the fibres of a distorted part is exceeded, to thereby permanently deform it to a more nearly straight condition, but not of such magnitude as to exceed the elastic limit of the fibres of a part that has not distorted from its intended shape during heating.

After the workpiece has been flexed in opposite directions one or more times, the dies 23—26 are returned to their relative neutral position shown in Fig. 1. They remain in this position while the workpiece clamped between them is subjected to the quenching medium for a time long enough to become sufficiently stable as to shape, so that no significant distortion will thereafter occur. It is then removed from the dies, but is kept subjected to a liquid quenching medium at least until hardening is substantially complete and, with conventional quenching oils, preferably until it has reached a safe handling temperature, about 100 to 150 degrees F. However, as soon as one workpiece is removed from the dies another may be inserted. A typical automobile rear axle ring gear, of about eight and one-half inches diameter and mass of seven pounds, composed of S. A. E. 8615 steel, was satisfactorily treated by our new method by carburizing and heating to about 1550 degrees F., flexing through two cycles between dies by an amplitude (axial motion of dies 24, 25 relative to dies 23, 26) of .010 inch to either side of its neutral condition, then quenching while between the dies for ten seconds (which lowered the temperature of the workpiece to an estimated 700 degrees F.), then removing the workpiece from clamped relation between the dies but retaining it in the quenching liquid for 140 seconds. At the end of this time the temperature of the workpiece was about 130 degrees F. The quenching medium was mineral oil of paraffin base whose Saybolt viscosity was 100 seconds at 100 degrees F. and whose temperature during the quenching operation was in the range of 110 to 120 degrees F.

Figure 4:
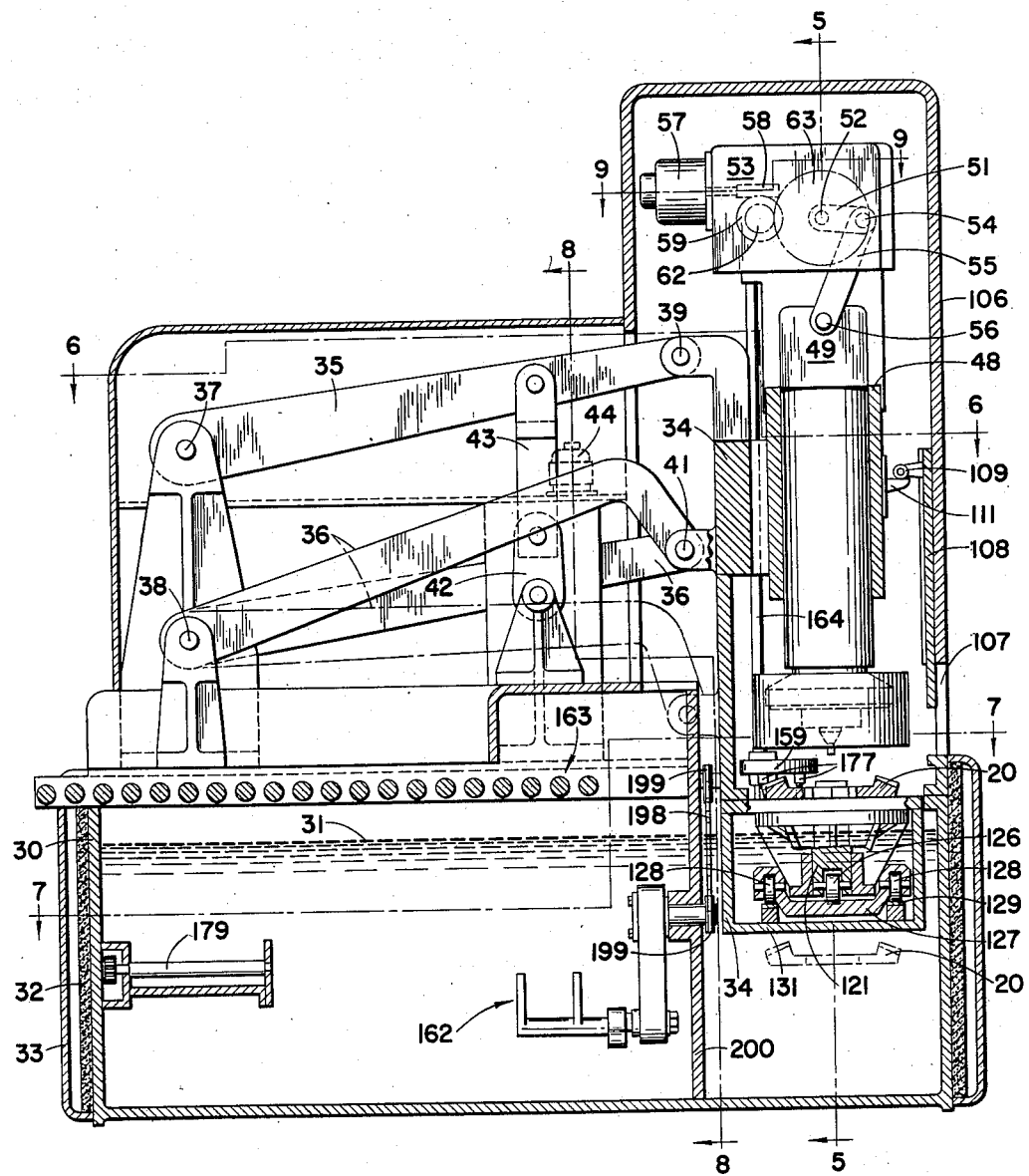
Fig. 4 is a vertical section taken longitudinally through the machine, approximately in the planes designated by line 4—4 in Fig. 8.
Figure 5:
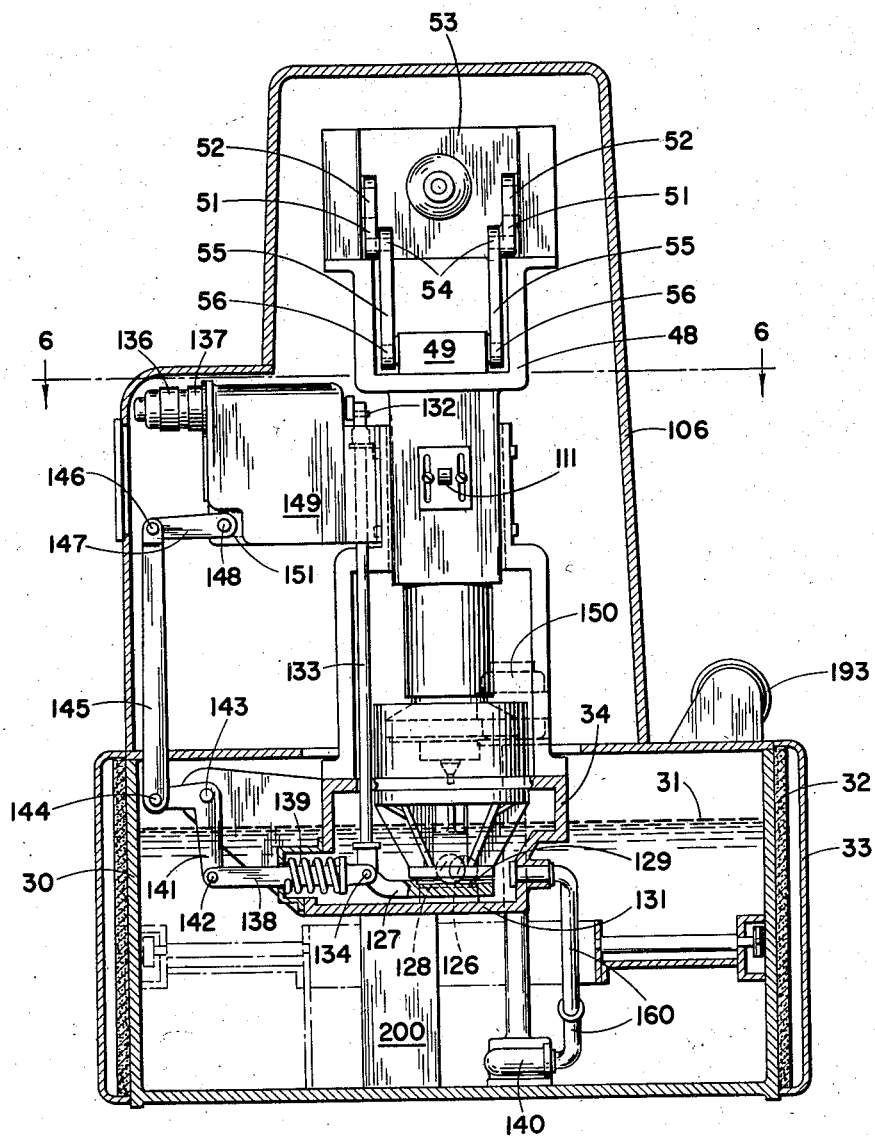
Fig. 5 is a vertical transverse sectional view in plane 5—5 of Fig. 4.
Figure 8:
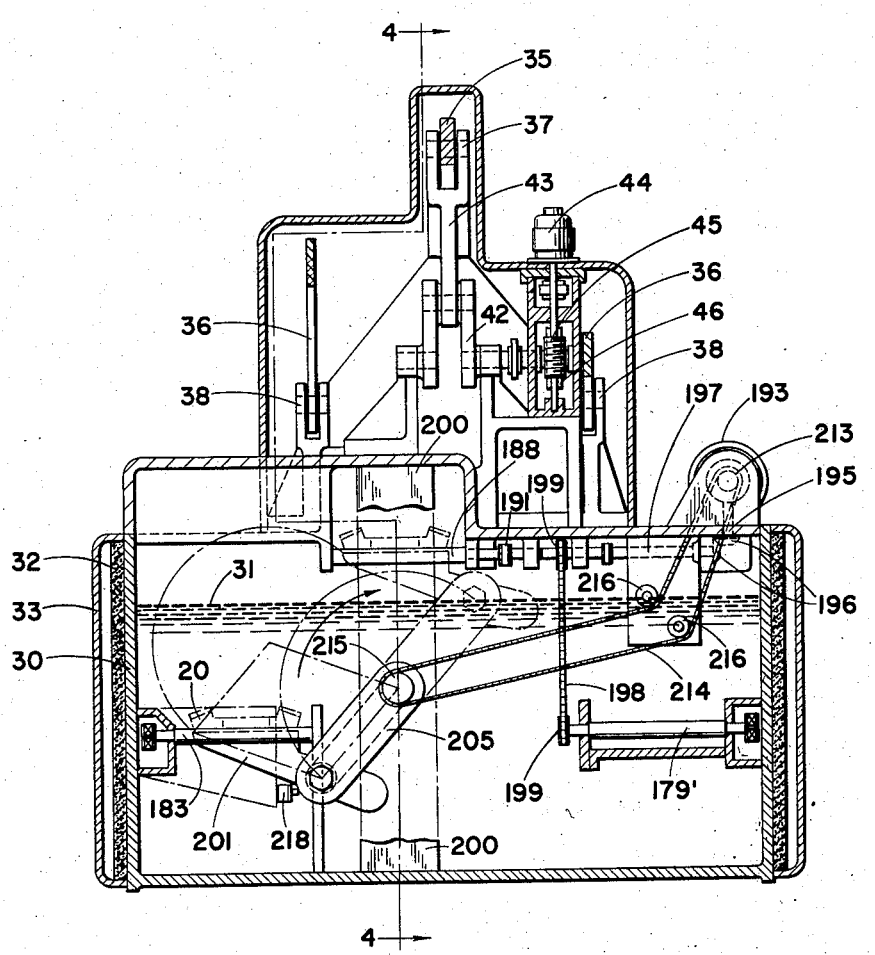
Fig. 8 is a vertical transverse sectional view in plane 8—8 of Fig. 4.

As shown in Figs. 4 to 6, the machine for carrying out the method comprises a main frame 30 comprising a tank filled with a liquid quenching medium to approximately level 31. At least in instances where this liquid is to be maintained at a temperature above approximately 150 degrees F., the thermal insulation 32 and an air space is provided between the sides of the frame and a shield 33 that is extended around it. For example, the liquid may be maintained without ignition at a relatively high temperature, say 450 degrees F., by keeping its exposed surface within the machine blanketed under a non-oxidizing atmosphere. A press frame 34 is supported by an upper arm 35 and a pair of lower arms 36 for vertical motion on the main frame. Arms 35 and 36 are respectively pivoted to the main frame at 37 and 38, and to the press frame at 39 and 41. The arms are of the same length and thus constitute a parallelogram device which keeps the press frame upright throughout its vertical motion. This motion is effected by a crank 42, Figs. 4, 6 and 8, which is rotatable on the main frame and has its crank pin connected to the upper arm 35 by a pitman 43. The crank is driven by a motor 44, Figs. 4 and 8, through reduction gearing comprising a worm 45 on the motor shaft and a worm wheel 46 on the crankshaft. When the crank is in the position shown in Fig. 4 a workpiece carried by the press frame will be above the level 31. This is the loading position of the press frame. When the crank is rotated through 180° to bring the arms 36 to the position shown in broken lines in Fig. 4, the workpiece is brought below level 31 to its Fig. 4 broken line position.

Adjustable vertically on the press frame 34, along guideways 47, Fig. 6, is a ram support 48 in which the ram of the press, designated 49, is reciprocable vertically. Such reciprocation is effected by a pair of cranks 51, Fig. 5, whose shafts 52 are journaled for rotation in a crank drive housing 53 on the ram support. The crank pins 54 are pivotally connected to the ram 49 by a pair of pitmans 55 which in turn are pivoted to trunnions 56 of the ram. As shown in Fig. 9 the two cranks 51 are rotated in unison by a motor 57 through a gear drive train including a worm 58 on the motor shaft, a worm wheel 59 on the shaft 61, and pinions 62 on shaft 61 meshing with gears 63 on the crank shafts 52. The motor is operated to rotate the crank through increments of one half-turn between its upper and lower dead-center positions, to thereby alternately lower and raise the ram.

As shown in Figs. 11 and 13 to 15, the ram body comprises a plurality of body sections 64 to 71, inclusive, rigidly secured together. Slidable vertically in section 65 is a sleeve 72 having a lower flange 73 for carrying die 26. Downward motion of the sleeve in the ram body is limited by its shoulder 74 abutting section 64, while upward motion is resisted by a plurality of compressed coil springs 75. These springs are backed by a member 76 which is adjustable vertically in body section 65 to compress the springs to the desired load. Such adjustment is effected by rotating a tubular screw 77 which is threaded to body section 66 and through an anti-friction thrust bearing 78 bears upon the member 76. The screw is splined to a ring-shaped worm wheel 79 which is rotated within body section 67 by turning a worm 81. The worm is turned in section 67 by means of a suitable wrench applied to the worm shaft 82.

A sleeve 83 slidable vertically in sleeve 72 has a flange 84 for carrying die 25. Abutment of shoulder 85 with flange 73 limits the downward motion of sleeve 83 which is urged by coiled compression springs 86 acting against a spider 87 which rests on the sleeve. The springs react against a similar spider 88 which is adjustable vertically by means of a tubular screw 89, an anti-friction thrust bearing 91 being interposed between the spider and the screw. The screw is threaded into body section 68 and to adjust the preload of springs 86 is rotated by means of a ring-shaped worm gear 92 that is splined to it. The worm gear is rotated by a worm 93 that may be turned in body section 69 by a suitable wrench in the same way that worm 81 is rotated in body section 67.

Slidable vertically in sleeve 83 is a tubular member 94 for carrying a tapered die expander 95 and guide rod 96. A coiled compression spring 97 urges the member 94 downwardly to a limit position wherein shoulder 98 abuts flange 84. The spring reacts against a cup 99 which is spaced from a tubular adjusting screw 101 by an anti-friction thrust bearing 102. The screw is threaded into section 71 of the ram body and is rotated by means of a ring worm wheel 103 to adjust the preload of spring 97. The screw also serves as a guide for the spider 88. Worm wheel 103 is splined to the screw and is turned by means of a worm 104 which is rotated in section 70 in the same manner that worm 81 is rotated in section 67.

Expander 95 cooperates with a multi-part or split centering die 105, Fig. 11, which engages the inner periphery of the workpiece 20. The dies 25 and 26, and the expander 95, are so proportioned, and the ram support 48, Fig. 4, is so adjusted vertically on the press frame 34, that when the ram is lowered to cause die 26 to clamp the workpiece against lower die 23, the sleeve 72 further compresses springs 75 and moves shoulder 74 away from ram section 64. Similarly, when the die 25 and the sleeve 83 move upwardly, the springs 86 are further compressed and shoulder 85 is spaced from flange 73. Also similarly, when the expander 95 and the member 94 move upwardly, the spring 97 is further compressed and shoulder 98 is moved away from flange 84. The spacing of shoulder 98 above flange 84 (see Fig. 11) must be great enough to accommodate the upward motion of dies 24 and 25 depicted in Fig. 3. This upward motion is effected by moving the die 24 by means which will be described hereinafter and is accompanied by a still further compression of springs 86. The space between shoulder 85 and flange 73 must be great enough to permit the downward motion of dies 24 and 25 shown in Fig. 2. In practice these motions of dies 24 and 25 will usually not exceed 0.02 inch from the neutral position shown in Fig. 1.

As shown in Fig. 4 the press frame and the parts supported by it are enclosed in column 106 of main frame 30. This column has an opening 107 through which workpieces may be loaded in the press. A door 108 for the opening is slidable vertically on the column and has roller 109 engaging a finger 111 which is adjustable vertically on the ram support 48. This finger is adjusted to such height that when the ram support is lowered the door will descend by gravity to fully closed position and when the ram support is raised the door will be fully opened.

As shown in Fig. 11 the lower die rings 23 and 24 and spacer rings 112 and 113 are provided with a plurality of radial grooves 114 on their upper faces for conducting quenching fluid to the back face of the workpiece 20. Preferably these grooves communicate with vertical grooves 115 in the centering die 105. The rings 23 and 112 are supported on radial webs 116 which extend between tubular parts 117 and 118 of the press frame 34, and the rings 24 and 113 are supported upon radially extending arms 119 of a cylindrical part 121 that is slidable vertically in part 118. Each arm 119 is disposed between a pair of adjacent webs 116, and at least one arm has a key 122 engaging in a keyway in tubular part 117 to prevent cylindrical part 121 from turning. The rings 23, 24, 112 and 113 have radial grooves 123 in their lower faces wide enough to receive either the webs 116 or the arms 119, and they carry pins 124, Fig. 12, to hold them against unintentional rotation, the pins being adapted to seat in sockets 125 in the webs and arms. In the condition shown in Fig. 11, the rings 23 and 112 seat on the webs 116 and the grooves 123 thereof are aligned with arms 119 so that during vertical movements of the part 121 the arms may move idly with respect to these rings. On the other hand the rings 24 and 113 seat on the arms 119, so that they will move vertically as a unit with part 121; and the grooves 123 of these rings are aligned with the webs 116 which therefore will not abut these rings at any time during such vertical motion. The construction is such that if desired the rings could be rotated to change the alignment of grooves 123, for example so that rings 23 and 112 would be supported by the arms 119 and rings 24 and 113 on the webs 116. This arrangement might be employed where it is desired to flex the workpiece by holding rings 24 and 25 stationary and moving the rings 23 and 26 vertically with respect to them, the obvious reversal of the operation illustrated in Figs. 1 to 3.

For effecting the vertical movement, a roller 126 on part 121 and a supporting and actuating lever 127 therefor are provided. On the lever are laterally spaced coaxial rollers 128 which serve to fulcrum it. These rollers preferably have their axes in the same or nearly the same horizontal plane as the axis of roller 126 and they ride on hardened rails 129 supported by the bottom wall 131 of the press frame 34. The lever is rocked vertically by means of an adjustable throw crank 132, Figs. 5, 6 and 16, acting through a pitman 133 which is pivoted to the lever by pin 134. The crank shaft, 135, is operated by a motor 136 through a high-reduction gear unit 137. It will be understood from Figs. 4 and 5 that when the lever 127 is so positioned that the axes of rollers 128 and 126 are coincident, or lie in the same vertical plane, rocking of the lever will not effect vertical motion of part 121 or of the dies supported thereon, but that when the lever is shifted along rails 129 to move the axes of the rollers out of coincidence or vertical alignment, then the rocking will cause such vertical motion.

For effecting such shifting of the lever, a spring and lever actuated rod 138 is pivoted to it by pin 134. A spring 139 acts between the press frame 34 and the rod to urge the lever to the right, in Fig. 5, while a bellcrank lever 141 pivoted to the rod at 142 resists the spring-urged motion and thereby controls the position of the lever 127. The bellcrank lever is fulcrumed on the press frame at 143 and it is pivoted at 144 to a link 145 which in turn is pivoted at 146 to a lever arm 147 secured to a shaft 148. This shaft is journaled in a cam bracket 149 that is secured to the press frame 34, and splined to the shaft within the bracket is an arm 151 carrying a cam follower roller 152. By adjusting the arm 151 axially along the shaft 148 this roller may be positioned to ride on the periphery of any one of six cams 153. All of these cams are secured upon shaft 154 which is rotatable in the cam bracket and carries a worm gear 155 driven by a worm 156 on motor driven shaft 135. Each of the cams has a different number of lobes 157, cams 153a and 153f respectively having two and twelve lobes, and the intermediate cams respectively having three, four, six and eight lobes. The ratio of worm gearing 155, 156 is one to twenty-four so that for an advance of the selected cam 153 by one pitch, i. e. from one lobe to the next, the work flexing crank 132 will make $$\frac{24}{N}$$

revolutions, where N is equal to the number of lobes on the cam. Thus with the two lobe cam 153a there will be twelve up and down flexes of the work for one lobe-to-lobe advance of the cam, while with the twelve lobe cam there will be two such flexes. A two-position limit switch 158 is arranged, as will be described in detail later on, to be operated by arm 147 to stop the work-flexing cycle and start the force quenching cycle each time the roller 152 reaches the crest of a cam lobe. Thus the position of adjustment of arm 151 along shaft 148 determines the number of flexures of the work in one machine cycle.

The height of the cam lobes and the length of the several arms in the lever system 149, 147, 141, is such that the rollers 128 are brought into vertical alignment with roller 126 at the end of each flexing cycle. This automatically restores the die-supporting part 121 to its neutral vertical position irrespective of the exact position in which the crank 132 stops at the cycle end. The amount of flexure of the workpiece during the flexing cycle of course depends upon the throw of crank 132, which is made adjustable in any suitable known manner, not shown.

For force-quenching the workpiece 20 while it is clamped between the dies, there is provided in the quench tank a pump 140 operated by a motor 150, on the top of the tank, and a conduit 160 comprising a pair of telescoping sections respectively pivoted to the outlet of the pump and to the part of the press frame 34 adjacent the lower dies. By arranging the axes of these pivots parallel to the axes of pivots 37, 38, 39 and 41, and making the conduit sections free to telescope, the conduit is made flexible enough to permit the afore-described vertical motion of the press frame. When the motor 150 is operated the pump 140 draws quenching medium from the tank and directs it through the flexible conduit 160 into the lower portion of the press frame from which it passes between webs 116 and arms 119 and, as shown by arrows in Fig. 11, through the grooves 115 and 114, the intertooth spaces of the workpiece, and finally returns through openings in the lower flange 73 of the ram 49 into the tank.

Figure 7:
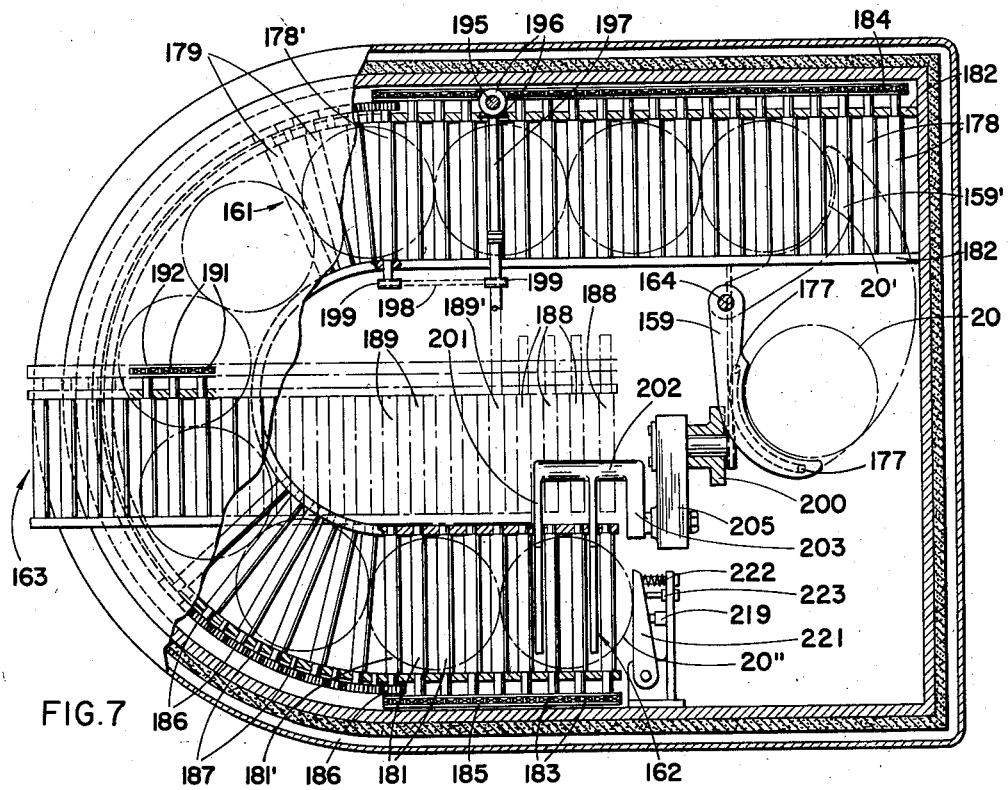
Fig. 7 is a horizontal sectional view in the planes indicated by section line 7—7 of Fig. 4.

When the dies open at the conclusion of this force-quenching operation, the workpiece is pushed off the lower dies 23, 24 by an unloader arm 159, Figs. 4 and 7, onto a U-shaped roller conveyor 161 which is disposed in the frame beneath the liquid level 31. Upon reaching the end of this conveyor (the lower right end in Fig. 7) the workpiece is lifted by an elevator 162 onto another roller conveyor, 163, which carries it from the machine, preferably discharging it into a tote box disposed at the left end of the machine, in Fig. 7, or onto a further conveyor system, not shown.

Unloader arm 159 is secured to a vertical shaft 164 which is operated by a mechanism within the crank drive housing 53, Figs. 4, 9 and 10. This mechanism comprises a cam plate 165 secured onto shaft 52 and having on one face thereof a continuous cam groove 166. The latter is engaged by a follower roller 167 on a lever 168 which is fulcrumed to the housing at 169. In the distal end of the lever there is a slot 171 engaging a pin 172 provided on a rack 173 which is slidable horizontally in the housing on a guide 174. The teeth of the rack mesh with a pinion sector 175 secured upon the upper end of shaft 164. The angular relation of the cam 165, 166 to the crank arms 51, which raise and lower the ram of the press, is such that as the crank arms rotate through one half turn to raise the ram and thereby open the dies 25, 26, the lever 168 is swung by the cam first to the left in Fig. 10 and then to the right; thereby acting through the rack and pinion sector to swing the arm 159 first counter-clockwise in Fig. 7 to the broken line position 159', to eject a workpiece from the lower dies, and then clockwise to its initial position. When in its left-most position in Fig. 10 the rack 173 projects into a tubular guard 176 on the housing 53. The cam groove 166 is so shaped that during the other half revolution of cranks 51, i. e. while the ram is descending, the unloader arm 159 is held stationary. As shown the unloader arm preferably has two depending pins 177, adjustable in the arm to engage workpieces of widely varying diameters.

The U-shaped roller conveyor 161, onto which the workpieces drop at station 20', comprises three series of rollers, 178, 179, and 181, all of which are journaled for rotation in flanges 182 of the frame. Rollers 178 and 181 are parallel to each other and each has a sprocket 183 engaged by an endless drive chain. The chain for driving rollers 178 is designated as 184 and that for rollers 181 as 185. Rollers 179 are arranged radially of a common center and each has a drive gear 186 connected to the adjacent drive gears by an intermediate idler gear 187 that is journaled for rotation in the outer flange 182. The last roller 178, designated 178', and the first roller 181, designated 181', also have drive gears 186, so that the three series of rollers are all connected for rotation. As indicated in Fig. 7, the conveyor 161 carries each workpiece through the chamber of quenching liquid from station 20' to station 20" adjacent elevator 162. The rate of travel of the conveyor is slow enough that the workpieces will be cooled to the desired degree. For example a typical workpiece may remain on the conveyor 161 from two to four minutes, in quenching oil of about 110°–130° F., and be cooled from about 600° to about 150° F.

The upper roller conveyor 163 comprises a series of four rollers 188 supported at only one end (the right end in Fig. 8) in bearings in the frame, and a second series comprises a number of rollers 189 journaled at both ends. The rollers 188 and 189 all have sprockets 191 connected by an endless chain 192. The drive for the rollers of both conveyors, and also for elevator 162, is from motor 193, Figs. 6, 7 and 8, through reduction gear unit 194, vertical shaft 195, and bevel gears 196 to extension 197 of an intermediate one of rollers 189, designated 189'. Roll 178' (and hence all rollers 178, 179 and 181) is driven from roller 189' by an endless chain 198 running over sprocket 199 secured to the two rollers.

The elevator 162 comprises a lifting fork 201 whose two tines are arranged to pass through the spaces between the last four rollers 181 and between the four rollers 188. Integral with the fork is a shaft portion 202 and an arm 203, the latter being secured to a shaft 204 that is rotatable in a hollow arm 205, Fig. 18, which is rotatable on a trunnion 206 provided on the support 200 of the frame 30. Keyed respectively to the trunnion and to shaft 204 are sprockets 207 and 208 of equal tooth number and over which runs an endless chain 209. The arrangement is such that as the arm 205 rotates the fork is maintained in horizontal position as it is moved in the circular path indicated by arrow in Fig. 8, which carries it between the position there shown in full lines, wherein it is about to engage a work gear 20 resting on rollers 183, and the position shown in broken lines wherein it has just deposited the work gear on rollers 189. The arm 205 is secured to a shaft 211 which is journaled in part 200 of the frame 30 and is coaxial with trunnion 206. For driving shaft 211 there is provided a reduction gear and magnetic clutch and brake unit 212 which is driven by the motor 193 and has a sprocket 213 connected by an endless chain 214 to a sprocket 215 on shaft 211. The chain also runs over a pair of idler sprockets 216 mounted on the frame.

The clutch and brake of unit 212, Fig. 6, are so constructed that when its winding 217, Fig. 19, is electrically energized the sprocket 213 is driven at a reduced speed by the motor 193 and when deenergized the sprocket is declutched from the motor and held against rotation by the brake. The clutch is controlled by a normally closed limit switch 218, Figs. 8 and 19, which is opened by the arm 205 when the latter approaches the position shown in full lines in Fig. 8; and by a normally open switch 219 which is closed by a stop member 221 when the latter is abutted by a work gear that is being advanced by rollers 183 of conveyor 161. The stop member is pivoted to the frame and is backed by a light spring 222 which in the absence of such work gear holds the member in the position shown in the wiring diagram, Fig. 19, wherein switch 219 is open. Under pressure of a work gear the stop member moves against a stationary abutment 223 on the frame as it closes the switch 219. A further device for controlling the clutch brake unit 212 comprises a relay having a winding 1R and a movable contact 1R-1 which is closed only when the winding is energized.

In operation of the machine, when a master switch (not shown) is closed, so that leads L-1 and L-2 are connected to a source of electrical energy, the clutch winding 217 remains deenergized when there is no work gear pressing against stop 221. This is because relay contact 1R-1 is opened as a result of winding 1R being deenergized due to both switches 218 and 219 being open. As soon as a work gear is carried by conveyor 161 against stop 221, the switch 219 closes, thereby energizing 1R and closing 1R-1. This energizes 217, engaging the clutch 212 and causing rotation of arm 205 by the motor 193. At the initiation of motion of elevator arm 205 the switch 218 closes so that relay winding 1R remains energized when switch 219 opens as a result of the elevator fork 201 lifting the workpiece 20 from the conveyor 161. When the arm 205 has completed one complete rotation, during the course of which it will have deposited the workpiece on discharge conveyor 163, it will open switch 218, thereby deenergizing relay 1R whose contact 1R-1 will immediately open to deenergize the clutch 212 and set the brake, thereby stopping the elevator. Of course, if before the arm 205 has completed its rotation another workpiece 20 engages the stop 221, then the switch 219 will be reclosed and the elevator will operate through another cycle without stopping.

Other instrumentalities for controlling the operation of the machine (excepting those for the conveyor and elevator system) are shown in the diagram, Fig. 20. They include a manually operated push-button type cycle starting switch having normally open contacts 224a and 224b; a normally closed, push-button type stop switch 225, which, if pressed, will immediately stop any or all of motors 44, 57, 136 and 150; a relay having a winding 2R and contact 2R-1 which is closed only when the winding is energized; a relay having a winding 3R and contacts 3R-1 and 3R-2 which are closed only when the winding is energized; and a latch relay having windings 4R and 4r and contacts 4R-1, 4R-2 and 4R-3. This latch relay is so constructed that its contacts remain in the last position to which they are moved by energization of the windings. When energized the winding 4R closes contact 4R-1 and opens contacts 4R-2 and 4R-3; winding 4r when energized opens 4R-1 and closes 4R-2 and 4R-3.

There is also a quench cycle timing relay whose contacts T-1 and T-2 close, and whose contact T-3 opens, with a time delay, upon energization of winding T; this relay or timer also having a contact T-4 which closes immediately upon energization of the winding. The duration of the delay in action of contacts T-1, T-2 and T-3 is adjustable to vary the length of the force quenching effected by the pump-motor unit 140, 150 while the workpiece is clamped between the upper and lower dies.

Controllers are also provided for motors 44, 57, 136 and 150, the winding of the controller for the press frame motor 44 being designated as PC, that for the ram motor 57 as RC, that for the work flexing motor 136 as FC and that for the quenching pump motor 150 as QC. The motors operate only when their respective controllers are energized and are immediately stopped by associated brake mechanisms when their controllers are deenergized. Further control means comprise limit switches which reflect the positions of the press frame operating crank 42 and the ram operating crank 51. These include a switch having movable contacts 226a and 226b which are opened only when the press frame is fully raised; a switch 227 which is opened only when the press frame is fully lowered; a switch having contacts 228a and 228b which are opened only when the ram is fully raised and a contact 228c which is closed only when the ram is fully raised; and a two position switch 229 which is normally in its upper, full-line, position in Fig. 20, and is in its lower, dotted-line, position only when the ram is fully lowered. The limit switch 158, operated by the flexure cycle control cam 153 through follower 152 and lever 147, is also a two-position switch which is in its lower, full-line, position when the follower is on a cam lobe 157 and otherwise is in its upper, dotted-line, position.

The operating sequence of the machine (except for the conveyor and elevator system previously explained) will now be described primarily with reference to Fig. 20. At the start of an operating cycle the ram 49 and the press frame 34 are both in their uppermost positions, and the door 108 is open. The operator closes a master switch, not shown, connecting leads L-1 and L-2 to a suitable source of electrical energy and thereby energizes relay winding 4r since ram-up contact 228c is closed. This assures that contact 4R-1 is closed and contacts 4R-2 and 4R-3 are open. The operator loads a workpiece onto lower dies 23, 24, and momentarily presses the start switch button. Closing of contact 224a establishes a circuit from L-1 to L-2 through relay winding 2R, causing contact 2R-1 to close, and also connects L-1 to a lead 231; and closing of contact 224b energizes ram motor controller RC through a circuit from 231 to L-2 through ram-down switch 229 (in upper position). As soon as the ram is started down by motor 57 the contacts 228a and 228b close, and contact 228c opens to deenergize winding 4r. Closing of 228a establishes a shunt through now closed contact 2R-1 around contact 224a, and closing of 228b a shunt around switch contact 224b, so that relay 2R and the ram motor controller RC remain energized although the operator now releases the start switch button and thereby allows contacts 224a and 224b to open.

As soon as the ram is fully lowered, clamping the heated workpiece between the upper and lower dies 23—26, ram-down switch 229 is shifted to its lower, dotted-line, position, thereby breaking the circuit for RC and stopping the ram motor; and, at the same time, establishing a circuit through now closed contact 4R-1 from 231 to L-2 through the controller FC for flexing motor 136, which acts through the dies to flex the heated workpiece toroidally.

As soon as the follower roller 152 is off the lobe 157 of cam 153, switch 158 shifts to its upper, dotted-line, position, thereby energizing latch relay winding 4R, with the result that contact 4R-1 opens and contacts 4R-2 and 4R-3 close. Hence the flexure motor controller remains energized by the branch circuit from 231 to L-2 through switch 158 (dotted-line position) and contact 4R-2.

The flexing cycle concludes when the roller 152 again rides on a lobe 157 of cam 153, which shifts switch 158 to its lower, full-line, position. This deenergizes the flexure motor controller since the latch relay contact 4R-1 is now open. Since the latch relay contact 4R-3 is now closed, relay winding 3R is energized, simultaneously causing the motor 44 to operate to lower the press frame, the motor 150 to operate to force quench the workpiece clamped between the dies 23—26, and the timing relay to start to time the quenching cycle. Winding T of the timing relay is energized by a circuit from 231 to L-2 through relay contact 3R-2 and connection 232, and, due to the immediate closing of its contact T-4, will remain energized even when contact 3R-2 is subsequently opened. Motor 44 operates because its controller PC is energized by a circuit from 231 to L-2 through timing relay contact T-4 (and 3R-2), switch 227 and relay contact 3R-1 (and limit switch contact 226b). Motor 150 operates because its winding QC is energized by a path from 231 to L-2 through T-4

(or 3R–2) and time delay contact T–3. When the press frame reaches its lowermost position switch 227 is opened; its motor 44 is stopped due to break of the circuit of its controller PC.

The force quenching period ends when timing relay contacts T–1 and T–2 close and contact T–3 opens. The latter deenergizes winding QC, stopping the force quench motor 150. Closing of T–1 establishes a branch circuit from 231 to L–2 through now closed ram-up switch contact 228b and controller winding RC, causing the motor 57 to operate to raise the ram, thereby causing the dies to unclamp the workpiece. As the ram rises the unloader arm 159 is actuated to eject the workpiece from the lower dies onto the rollers 178 of the conveyor 161, this action occurring while the workpiece is still below the liquid level 31. Closing of T–2 establishes a circuit from 231 to L–2 through now closed press frame-up switch contact 226b (and also through relay contact 3R–1) through controller winding PC, causing the motor 44 to operate to raise the press frame and open the door 108.

As soon as the ram starts to rise, the ram-down switch 229 is shifted from its dotted-line to its full-line position, whereby breaking the circuit through relay winding 3R. Contacts 3R–1 and 3R–2 open at once but with no immediate effect. However as soon as the press frame reaches its upper limit position, so that contact 226b opens, the open condition of contact 3R–1 results in the controller winding PC being deenergized, so that motor 44 stops. The ram stops when it reaches its uppermost position due to opening of ram-up switch contact 228b which deenergizes controller winding RC. When both the ram and the press frame are up, so that both switch contacts 228a and 226a are opened, lead 231 is disconnected from L–1, deenergizing the entire net-work shown in Fig. 20 except for latch relay winding 4r which is energized by closing of ram-up switch contact 228c and closes contact 4R–1 and opens contacts 4R–2 and 4R–3 in preparation for the next operating cycle of the machine.

Having now described the preferred manner of practicing our new method, and the preferred embodiment of our invention as respects the machine and its mode of operation, what we claim is:

1. The method of treating a substantially ring-shaped quench-hardenable workpiece comprising clamping it while hot between dies, actuating the dies to cause relative back and forth motion between the inner and the outer peripheral portions of the workpiece in the direction of the axis of the workpiece, to thereby flex the workpiece toroidally back and forth about a neutral circle to opposite sides of a neutral position.

2. The method of heat treating according to claim 1 in which at the conclusion of the flexing the clamped workpiece is returned to a position intermediate of its terminal positions of flexure and while held in such intermediate position is subjected to a quench liquid.

3. The method of claim 2 in which before quench-hardening is completed the workpiece is ejected from the die elements and travelled through a bath of quenching liquid.

4. The method of heat treating a substantially ring-shaped quench-hardenable workpiece comprising clamping the workpiece while hot between a plurality of dies, effecting relative motion of the dies to cause relative back and forth motion between the inner and the outer peripheral portions of the workpiece in the direction of the axis of the workpiece, to thereby flex the workpiece toroidally back and forth about a neutral circle and to then restore the workpiece to substantially neutral position, then subjecting the clamped workpiece to a quenching liquid, and, before hardening is complete, ejecting the workpiece from the dies and traveling it through a bath of quenching liquid.

5. The method of claim 4 in which the dies are immersed in the quenching bath prior to ejection of the workpiece so that the liquid quenching of the workpiece is continuous.

6. A method of treating a substantially ring-shaped heat-treatable metal part which comprises gripping surface portions at opposite sides thereof between concentric die elements, and then relatively reciprocating said elements in the direction of their common axis to thereby flex the part toroidally back and forth about a neutral circle to opposite sides of a predetermined substantially neutral position; restoring said elements to the relative positions thereof in which they hold the part against flexure in said substantially neutral position; and while so holding the part applying a quenching medium to it.

7. A method of treating a substantially ring shaped part that is subject to heat treat distortion, which comprises gripping concentric surface portions on opposite sides thereof between concentric die elements, and then relatively oscillating said die elements in the direction of their common axis, to thereby flex the part toroidally back and forth about a neutral circle to opposite sides of a predetermined substantially neutral position.

8. A quenching apparatus comprising a plurality of concentric dies adapted to receive between them a substantially ring shaped heat-treatable metallic workpiece, means to open and close said dies to respectively receive and then clamp the workpiece, means to relatively oscillate the closed dies to flex the clamped workpiece toroidally back and forth about a neutral circle, and means to apply a quenching medium to the workpiece subsequently to such flexure and while the workpiece is held clamped between the dies.

9. A quenching apparatus comprising a pair of concentric lower dies and a pair of concentric upper dies, means to open and close the upper and lower dies for the purpose of receiving and then clamping therebetween a substantially ring shaped workpiece, actuating means operative when the dies are closed to oscillate one upper and one lower die axially, relative to the other dies, to opposite sides of a neutral position to thereby flex the clamped workpiece toroidally, and means to apply a quenching medium to the workpiece subsequently to such flexure and while the workpiece is held clamped between the dies.

10. A quenching apparatus comprising a chamber containing a pair of concentric lower dies and a pair of concentric upper dies, means to open and close the upper and lower dies for the purpose of receiving and then clamping therebetween a substantially ring shaped workpiece, at least one pair of said dies having spaced work engaging surfaces, actuating means, operative when the upper and lower dies are closed, to oscillate the dies of said one pair relatively to each other in an axial direction to thereby flex the clamped workpiece toroidally back and forth about a neutral circle, and means to apply a quenching medium to the chamber subsequently to such flexure.

11. Apparatus for treating a substantially ring shaped part that is subject to heat treat distortion, comprising a plurality of concentric dies, adapted to confine the part therebetween, means to open and close the dies to respectively receive and then clamp the workpiece between them, and means to relatively oscillate the closed dies to flex the clamped workpiece toroidally back and forth about a neutral circle.

12. Apparatus for treating a substantially ring shaped part that is subject to heat treat distortion, comprising a pair of concentric lower dies and a pair of concentric upper dies, means to open and close the upper and lower dies for the purpose of receiving and then clamping the part therebetween, and actuating means to oscillate axially one upper and one lower die, relative to the other dies, to opposite sides of their neutral closed position to thereby flex the clamped part toroidally.

13. A quenching machine comprising a press having upper and lower pairs of workpiece-clamping dies, means to open and close said dies, and means to oscillate one upper die and one lower die relative to the other of said dies to thereby flex back and forth a workpiece clamped between the dies; a chamber for quenching liquid; means for effecting liquid quenching of a clamped workpiece; a conveyor for traveling the workpiece through the chamber for further quenching subsequent to release from the dies; and a device for transferring the workpiece from the press to the conveyor.

14. A quenching machine comprising a ram and a platen each of which has a set of relatively movable die supports, means for effecting relative oscillation of the die supports of one set, resilient means backing the die supports of the other set for permitting them to relatively oscillate corresponding to thereby flex back and forth a workpiece clamped between dies on said die supports, and means for adjusting the pressure exerted by said resilient means on the respective die supports backed by them.

15. A quenching machine according to claim 14, in which the resilient means and the die supports backed by them are carried by the ram, the latter die supports comprising telescoping elements telescoped within the ram, the resilient means comprise coil springs, and the adjusting means comprise members screw threaded to the ram and arranged to back the springs.

16. A quenching machine comprising a ram and a platen each of which has a set of relatively movable die supports, one set comprising at least one movable die support, means for oscillating said movable die support to thereby flex back and forth a workpiece clamped between dies on said supports, and other means for periodically rendering said oscillating means ineffective and restoring the movable die support to its neutral position.

17. A machine according to claim 16 in which the oscillating means comprises a variable throw crank.

18. A machine according to claim 16 in which said other means comprises a plurality of coaxial co-rotating cams having different numbers of lobes, and a cam follower adjustable to engage any selected one of said cams.

19. A machine according to claim 16 in which the oscillating means and said other means are connected together for concomitant operation.

20. A machine according to claim 19 in which the oscillating means includes a crank and a lever rocked thereby, and said other means comprising at least one lobed cam and a follower operated thereby to periodically shift the lever to change its effective length thereof, as respects the movable support, to zero.

21. A quenching machine having: a chamber for quenching liquid; a press having upper and lower dies for clamping a workpiece therebetween and means to open and close said dies; means for effecting vertical translation of the press to bring said dies respectively within and above the liquid in the tank; conveyor means for traveling the workpieces through the liquid in the chamber and then removing them from the chamber; a device operable in the chamber for transferring a workpiece beneath the liquid level in the chamber from said lower die of the press to the conveyor means; and means operating in sequence to (a) close the dies to clamp a workpiece, (b) lower the press, and (c) with a time delay open the dies, operate the transfer device and raise the press.

22. A quenching machine having: a chamber for quenching liquid; a press having upper and lower pairs of dies for clamping a workpiece therebetween, means to open and close said dies, and means to oscillate one upper die and one lower die relative to the other of said dies to thereby flex a clamped workpiece; means to lower and raise said press to bring said dies respectively within and above the liquid in the tank; a quenching conveyor in said chamber for carrying workpieces through said liquid from a press discharge station to an elevator station; a device for transferring a workpiece from the press to the quenching conveyor at said press discharge station; a work discharge conveyor above the liquid in the tank; an elevator to lift workpieces from the quenching conveyor to the discharge conveyor; and means operating in sequence to (a) close said dies to clamp a workpiece, (b) effect relative oscillation of the dies to flex the workpiece, (c) lower the press, (d) with a time delay open the dies, operate the transfer device to transfer the workpiece to the quenching conveyor and raise the press, and (e), when the workpiece reaches said elevator station, operate the elevator.

References Cited in the file of this patent

UNITED STATES PATENTS

| | | |
|---|---|---|
| 895,973 | Daniels | Aug. 11, 1908 |
| 976,891 | Machlet | Nov. 29, 1910 |
| 1,112,074 | Lichter | Sept. 29, 1914 |
| 1,459,045 | Buckley | June 19, 1923 |
| 1,742,730 | Rockhoff | Jan. 7, 1930 |
| 1,961,446 | Mogford et al. | June 5, 1934 |
| 2,459,183 | Roth | Jan. 18, 1949 |
| 2,467,665 | Gogan | Apr. 19, 1949 |
| 2,542,940 | Pioch et al. | Feb. 20, 1951 |
| 2,662,537 | Doyle | Dec. 15, 1953 |
| 2,748,038 | Adair et al. | May 29, 1956 |

FOREIGN PATENTS

| | | |
|---|---|---|
| 604,891 | Great Britain | July 12, 1948 |
| 667,961 | Great Britain | Mar. 12, 1952 |